(12) United States Patent
Franich

(10) Patent No.: US 10,150,575 B2
(45) Date of Patent: Dec. 11, 2018

(54) AIRCRAFT ANTI-COLLISION LIGHT

(71) Applicant: Goodrich Lighting Systems, Inc., Oldsmar, FL (US)

(72) Inventor: David Franich, Tempe, AZ (US)

(73) Assignee: GOODRICH LIGHTING SYSTEMS, INC., Oldsmar, FL (US)

(*) Notice: Subject to any disclaimer, the term of this patent is extended or adjusted under 35 U.S.C. 154(b) by 128 days.

(21) Appl. No.: 15/073,094

(22) Filed: Mar. 17, 2016

(65) Prior Publication Data

US 2017/0267375 A1    Sep. 21, 2017

(51) Int. Cl.
| | | |
|---|---|---|
| *B64D 47/06* | (2006.01) | |
| *F21V 7/06* | (2006.01) | |
| *F21V 7/00* | (2006.01) | |
| *F21V 7/04* | (2006.01) | |
| *F21Y 115/10* | (2016.01) | |

(52) U.S. Cl.
CPC ............ *B64D 47/06* (2013.01); *F21V 7/0058* (2013.01); *F21V 7/048* (2013.01); *F21V 7/06* (2013.01); *B64D 2203/00* (2013.01); *F21Y 2115/10* (2016.08)

(58) Field of Classification Search
CPC ....... B64D 2203/00; B64D 47/06; F21V 7/06; F21V 7/0058; F21V 7/048; F21K 9/232
See application file for complete search history.

(56) References Cited

U.S. PATENT DOCUMENTS

| | | | |
|---|---|---|---|
| 8,033,683 B2 | 10/2011 | Fields | |
| 8,807,792 B2 | 8/2014 | Cho et al. | |
| 9,200,764 B2* | 12/2015 | Yang | F21K 9/50 |
| 2007/0002572 A1* | 1/2007 | Ewig | B64D 47/06 |
| | | | 362/470 |
| 2008/0192480 A1* | 8/2008 | Rizkin | B64F 1/20 |
| | | | 362/310 |
| 2010/0027281 A1 | 2/2010 | Waters et al. | |
| 2013/0039056 A1* | 2/2013 | Cho | F21V 7/0058 |
| | | | 362/235 |
| 2015/0036342 A1* | 2/2015 | Yang | F21K 9/50 |
| | | | 362/241 |

FOREIGN PATENT DOCUMENTS

| | | |
|---|---|---|
| CN | 102853287 A | 1/2013 |
| WO | 2006091225 A1 | 8/2006 |
| WO | 2009084049 A1 | 7/2009 |

OTHER PUBLICATIONS

Search Report dated Aug. 16, 2017 in, EP Application No. 17151677, 10 pages.

* cited by examiner

*Primary Examiner* — Karabi Guharay
(74) *Attorney, Agent, or Firm* — Cantor Colburn LLP

(57) ABSTRACT

A light source includes a circular light element having a light source diameter, and a reflector disposed at least partially within the circular light element, the reflector having a first end with a first diameter and a second end with a second diameter, wherein the first diameter is less than the light source diameter and the second diameter is larger than the light source diameter, the second end having a plurality of slits.

7 Claims, 3 Drawing Sheets

AIRCRAFT ANTI-COLLISION LIGHT

This invention was made with government support with the United States Army under Contract No. W911W6-12-D-0006. The government therefore has certain rights in this invention.

BACKGROUND

The subject matter disclosed herein relates to lighting equipment, and more particularly, to lighting equipment for aircraft.

Anti-collision aircraft lighting is utilized within an aircraft to provide visibility to other aircraft and flight control personnel. Anti-collision aircraft lighting regulations require a prescribed field of coverage and minimum effective intensity at various angles below and above the horizontal plane. Often, anti-collision aircraft lighting may require numerous components or additional complexity to provide the required lighting pattern and intensity.

BRIEF SUMMARY

According to an embodiment, a light source includes a circular light element having a light source diameter, and a reflector disposed at least partially within the circular light element, the reflector having a first end with a first diameter and a second end with a second diameter, wherein the first diameter is less than the light source diameter and the second diameter is larger than the light source diameter, the second end having a plurality of slits.

According to an embodiment, a light source includes a circular light element having a light source diameter, and a reflector disposed at least partially within the circular light element wherein the reflector has a plurality of facets, wherein each of the plurality of facets has a facet ratio between each of a first facet diameter and a second facet diameter.

According to an embodiment, an aircraft includes an aircraft body, and at least one light source disposed on the aircraft body, the at least one light source, including a circular light element having a light source diameter, and a reflector disposed at least partially within the circular light element, the reflector having a first end with a first diameter and a second end with a second diameter, wherein the first diameter is less than the light source diameter and the second diameter is larger than the light source diameter, the second end having a plurality of slits.

Technical function of the embodiments described above includes that the first diameter is less than the light source diameter and the second diameter is larger than the light source diameter, the second end having a plurality of slits and each of the plurality of facets has a facet ratio between each of a first facet diameter and a second facet diameter.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
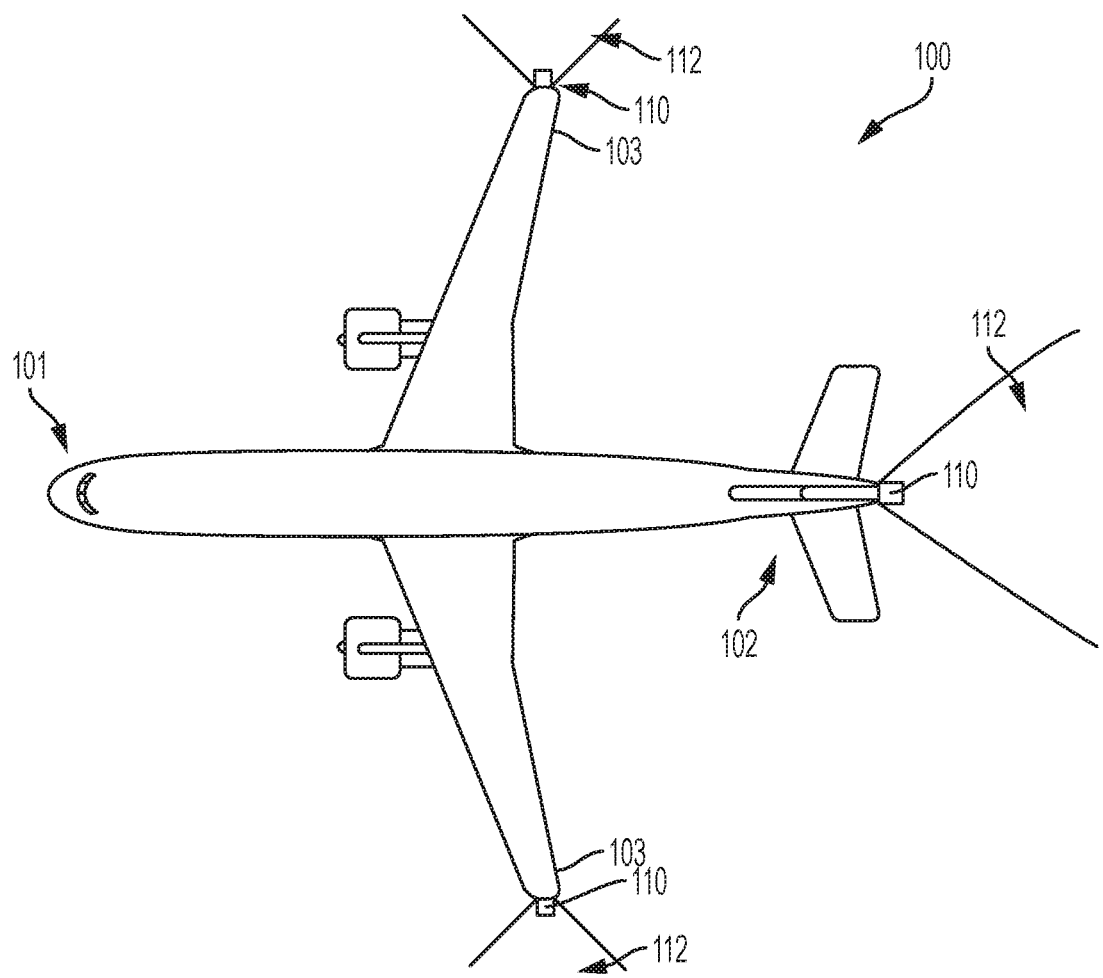
FIG. 1 is a schematic view of one embodiment of an aircraft.

Referring to the drawings, FIG. 1 shows an aircraft 100. In the illustrated embodiment, the aircraft 100 includes a fore portion 101, an aft portion 102, lateral portions 103 and at least one anti-collision light 110. In the illustrated embodiment, the aircraft 100 can utilize the anti-collision light 110 to provide a light radiation pattern 112 as required by regulations and operation requirements. In the illustrated embodiment, the anti-collision light 110 can provide a light radiation pattern 112 extending between 0 and 75 degrees in both above and below the horizontal plane. Advantageously, the anti-collision light 110 can provide the required light radiation pattern 112 with a minimum number of anti-collision lights 110, a minimum part count and maximum efficiency, while reducing complexity and positional tolerances.

Figure 2:
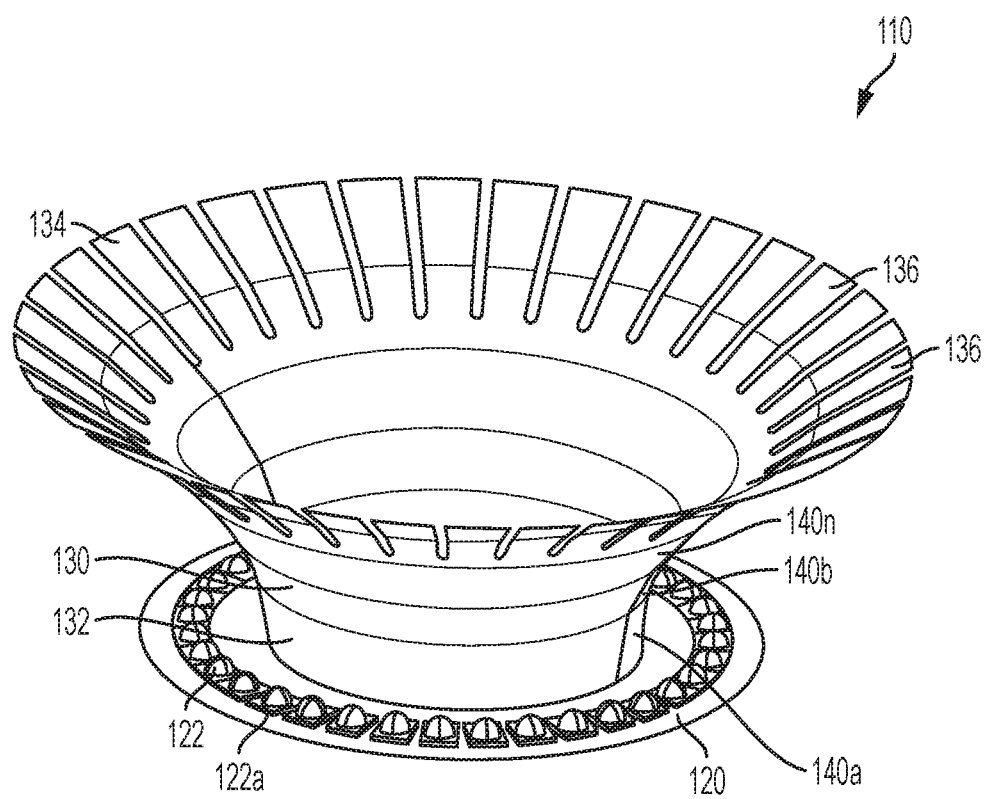
FIG. 2 is an isometric view of one embodiment of an anti-collision aircraft light for use with the aircraft of FIG. 1.
Figure 3:
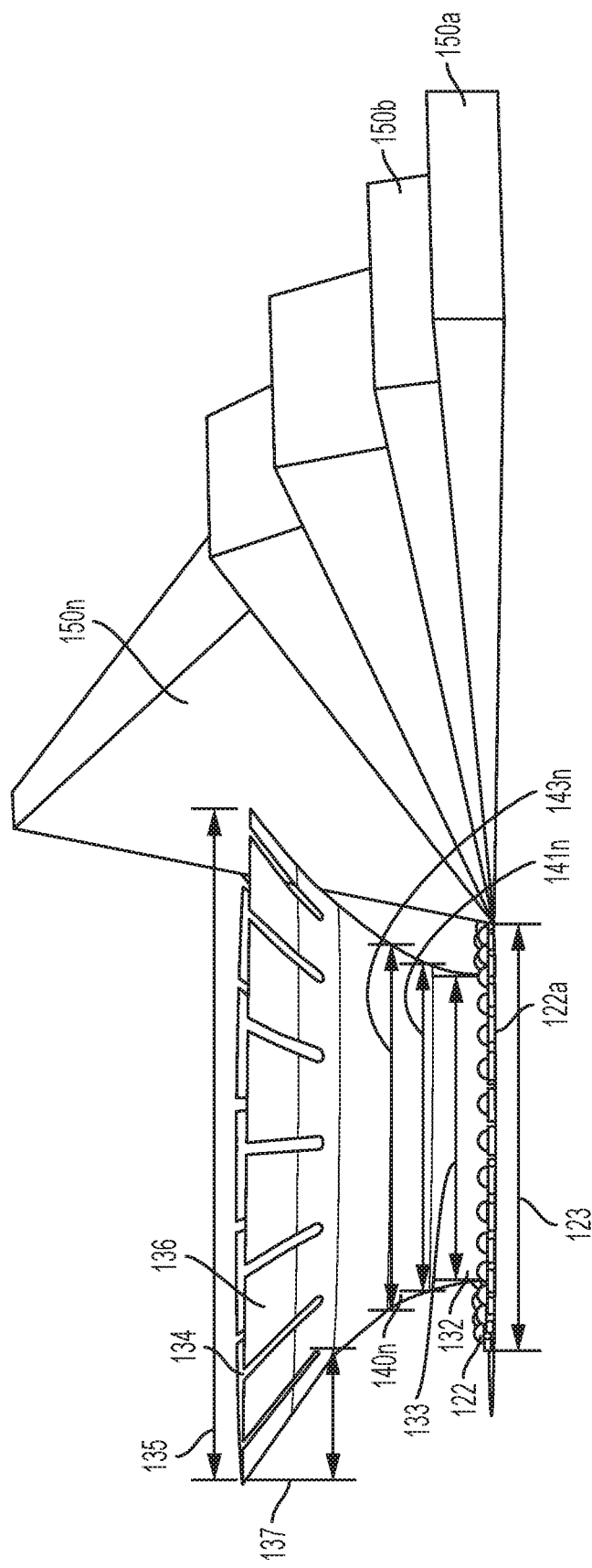
FIG. 3 is an elevation view of the anti-collision aircraft light of FIG. 2 further illustrating a light radiation pattern.

Referring to FIGS. 2 and 3, the anti-collision light source 110 is shown. In the illustrated embodiment, the anti-collision light source 110 includes a light element 122 and a reflector 130. In certain embodiments, anti-collision lighting systems are regulated by US Federal Aviation Regulation 14 CFR 25.1401.

Federal Aviation Regulation 14 CFR 25.1401 requires a field of coverage that must extend at least 75 degrees above and 75 degrees below the horizontal plane of the airplane. 14 CFR 25.1401 additionally requires that the field of coverage must be valid within any vertical plane, between 0 to 360 degrees. Further, 14 CFR 25.1401 requires the following intensities at the following angle above and below the horizontal plane:

| Angle above or below the horizontal plane | Effective intensity (candles) |
| --- | --- |
| 0° to 5° | 400 |
| 5° to 10° | 240 |
| 10° to 20° | 80 |
| 20° to 30° | 40 |
| 30° to 75° | 20 |

In the illustrated embodiment, the anti-collision light source 110 can provide a desired light radiation pattern 150a-150n while minimizing the number of required optical elements or additional light sources. Further, the anti-collision light 110 can increase optical efficiency and light output from a given light element 122 while simplifying construction, tolerances, and part count of the anti-collision light 110.

In the illustrated embodiment, the light element 122 can provide lighting to be directed by the reflector 130. The light element 122 can be disposed on a board 120. In the illustrated embodiment, the light element 122 and the reflector 130 can be affixed to the board 120.

In the illustrated embodiment, the light element 122 can be formed in a circular shape having a light element diameter 123. The light element diameter 123 can be any suitable diameter. Light element 122 can include light emitting diodes, ring lights, strobes, or any other suitable light element. In certain embodiments, the light element 122 can include multiple individual lighting elements 122a to provide lighting. Advantageously, anti-collision light source 110 can utilize a less powerful light element 122 or a fewer number of individual lighting elements 122a while still providing the desired intensity output of the anti-collision light source 110.

In the illustrated embodiment, the reflector 130 reflects light from light element 122 to form a desired light radiation pattern 150a-150n. In the illustrated embodiment, the reflector 130 has a first end 132, a second end 134, a plurality of facets 140a-140n, and a plurality of slits 136. In the illustrated embodiment, the geometry and construction of the reflector 130 allows for light radiation to be guided into high intensity regions and patterns are required by regulations and operational requirements.

In the illustrated embodiment, the reflector 130 is disposed on the board 120 within the light element 122. The reflector 130 can have a generally fustro-conical shape that is concentric with the light element 122. In certain embodiments, the reflector 130 is a parabolic reflector. In the illustrated embodiment, the first end 132 is generally coplanar to the light element 122. In certain embodiments, the first end 132 is disposed in a plane above or below the light element 122. In certain embodiments, the first end 132 is coupled to the board 120. The first end 132 has a first diameter 133. In the illustrated embodiment, the first diameter 133 is smaller than the light element diameter 123 and is disposed within the light element 122. The opposite end of the reflector 130 is the second end 134. In the illustrated embodiment, the second end 134 is disposed away from the light element 122. The second end 134 has a second end diameter 135 that may be greater than the light element diameter 123. In the illustrated embodiment, the reflector 130 has second end diameter 135 that is larger than the first end diameter 133.

In the illustrated embodiment, the reflector 130 can include a plurality of facets 140a-140n disposed between the first end 132 and the second end 134. In the illustrated embodiment, each facet 140n is a fustro-conical section that has a facet first diameter 141n and a facet second diameter 143n. In the illustrated embodiment, various facets 140a-140n can reflect and direct various portions of the light output from light element 123 to desired radiation patterns 150a-150n.

In the illustrated embodiment, the radiation pattern 150a-150n is illustrated. In certain embodiments, the radiation pattern 150a-150n is designed to comply with certain regulations such as Federal Aviation Regulation 14 CFR 25.1401 to provide prescribed light intensities at various angles above and below the horizontal plane within any vertical plane. Advantageously, the features of the reflector 130 allow for the radiation pattern 150a-150n to comply with the regulations while avoiding additional or higher energy light elements 122.

In the illustrated embodiment, the orientation, position, size and the facet ratio of the facets 140a-140n can determine the location and intensity of the radiation patterns 150a-150n. The facet ratio can be described as the ratio between the facet first diameter 141n and the facet second diameter 143n. In the illustrated embodiment, the facet ratio describes the relationship between the facet first diameter 141n and the facet second diameter 143n. The facet ratio can describe the slope of each facet 140n of the reflector 130. In the illustrated embodiment, each facet 140n has an associated facet ratio to direct radiation patterns 150a-150n as desired. Advantageously, facets 140a-140n allow for light to be easily directed in radiation patterns 150a-150n without requiring precise focusing of the reflector 130.

In the illustrated embodiment, the reflector 130 can include a plurality of slits 136. Slits 136 can be disposed at the second end 134 of the reflector 130. In the illustrated embodiment, the slits 136 can each have a slit length 137 that extends inward radially toward the center of the reflector 130. In the illustrated embodiment, the slits 136 can allow for emitted light energy to selectively pass through the slits 136 instead of being reflected by the reflector 130 to allow for the desired or required light intensity at greater angles such as 75 degrees above or below the horizontal plane. In the illustrated embodiment, in the area of the second end 134 between the slits 136, light energy is directed to other portions of the radiation pattern 150a-150n. In the illustrated embodiment, the slits 136 are sized and spaced apart to prevent shadows or other undesirable radiation patterns. Geometric characteristics of the slits 136 can be altered to achieve the desired radiation pattern 150a-150n. Geometric characteristics of the slits 136 include, but are not limited to slit number, slit angle, slit depth, slit size, and slit profile. Further, in certain embodiments, by introducing slits 136, the reflector height 130 can be increased to allow for more efficient operation of the anti-collision light source 110. In certain embodiments, with slits 136, the second end 134 can have a greater second end diameter 135 to further allow for more efficient operation of the anti-collision light source 110.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A light source, comprising:
   a circular light element having a light source diameter; and
   a reflector disposed at least partially within the circular light element wherein the reflector has a plurality of facets, wherein:
   each of the plurality of facets comprises upper and lower edges arranged substantially in parallel with a plane of the circular light element and an exterior surface extending between the upper and lower edges,
   the lower edge of each of the plurality of facets is closer to the circular light element than the corresponding upper edge,
   each of the plurality of facets has a facet ratio between each of a first facet diameter at the lower edge and a second facet diameter, which is greater than the first facet diameter, at the upper edge,
   the reflector further comprises a first end with a first diameter, which is less than the light source diameter, and a second end with a plurality of slits and a second diameter, which is larger than the light source diameter,
   the exterior surface of each of the plurality of facets extends between the upper and lower edges and forms, with at least one adjacent exterior surface of at least one adjacent facet, a parabolic reflective surface non-linearly curving between the first and second ends, and each slit extends from the second end, through the facet at the second end and into the adjacent facet.

2. The light source of claim 1, wherein each of the plurality of slits extends radially inward from the second diameter.

3. The light source of claim 1, wherein the reflector is disposed concentrically within the circular light source.

4. The light source of claim 1, wherein the light source provides a radiation pattern of at least 0 to 75 degrees above and below a horizontal plane.

5. The light source of claim 1, wherein the circular light element includes a plurality of light emitting diodes.

6. The light source of claim 1, wherein the circular light element is a single light element.

7. The light source of claim 1, wherein the first end is coplanar to the circular light element.

\* \* \* \* \*